United States Patent
Chi et al.

(10) Patent No.: US 10,802,618 B2
(45) Date of Patent: Oct. 13, 2020

(54) CURSOR CONTROL METHOD AND ELECTRONIC APPARATUS

(71) Applicants: Cheng-Ya Chi, Taipei (TW); Jyh-Chyang Tzou, Taipei (TW); Cheng-Shiue Jan, Taipei (TW)

(72) Inventors: Cheng-Ya Chi, Taipei (TW); Jyh-Chyang Tzou, Taipei (TW); Cheng-Shiue Jan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/392,590

(22) Filed: Apr. 23, 2019

(65) Prior Publication Data
US 2020/0064944 A1    Feb. 27, 2020

(30) Foreign Application Priority Data

Aug. 27, 2018 (TW) .............................. 107129845 A

(51) Int. Cl.
*G06F 3/0354* (2013.01)
*G06F 3/041* (2006.01)

(52) U.S. Cl.
CPC .......... *G06F 3/03547* (2013.01); *G06F 3/041* (2013.01)

(58) Field of Classification Search
CPC .... G06F 3/03547; G06F 3/041; G06F 3/0416; G06F 3/04883; G06F 3/038
See application file for complete search history.

(56) References Cited

U.S. PATENT DOCUMENTS

| | | | |
|---|---|---|---|
| 2013/0027434 A1* | 1/2013 | Paul | G06F 3/04886 345/660 |
| 2013/0093692 A1* | 4/2013 | Wang | G06F 3/0416 345/173 |
| 2013/0246965 A1* | 9/2013 | Ninomiya | G06F 3/016 715/781 |
| 2014/0359528 A1* | 12/2014 | Murata | G06F 3/0488 715/833 |

FOREIGN PATENT DOCUMENTS

| | | |
|---|---|---|
| TW | 201337658 | 9/2013 |
| TW | I598773 | 9/2017 |

OTHER PUBLICATIONS

"Office Action of Taiwan Counterpart Application", dated May 16, 2019, p. 1-p. 8.

\* cited by examiner

*Primary Examiner* — Abbas I Abdulselam
(74) *Attorney, Agent, or Firm* — JCIPRNET

(57) ABSTRACT

A cursor control method and an electronic apparatus are provided. A touch operation is received through a touch panel, and a designated region on the touch panel is set based on an initial position of the touch operation. During the execution of the touch operation, a current position of the touch operation on the touch panel is detected, and whether the current position is within the designated region is determined. If the current position is within the designated region, a cursor is moved at a first speed. If the current position is not within the designated region, a cursor is moved at a second speed.

12 Claims, 4 Drawing Sheets

CURSOR CONTROL METHOD AND ELECTRONIC APPARATUS

CROSS-REFERENCE TO RELATED APPLICATION

This application claims the priority benefit of Taiwan application serial no. 107129845, filed on Aug. 27, 2018. The entirety of the above-mentioned patent application is hereby incorporated by reference herein and made a part of this specification.

BACKGROUND

Field of the Invention

The disclosure relates to a cursor control mechanism and more particularly, to a cursor control method and an electronic apparatus that can change a speed of a cursor.

Description of Related Art

Currently available electronic apparatuses such as desktop computers and notebook computers are operated by not only mice but also touch panels. However, during an operation performed by using a touch panel, issues such as unfavorable smoothness of the cursor operation may occur when moving over a long distance through the touch panel due to the size of the touch panel. Therefore, by being compared with the mouse, the touch panel is less convenient to use.

SUMMARY

The disclosure provides a cursor control method and an electronic apparatus capable of dynamically adjusting a moving speed of a cursor.

A cursor control method of the disclosure includes the following steps. A touch operation is received through a touch panel, where a cursor is moved based on the touch operation. A designated region is set on the touch panel based on an initial position of the touch operation. During an execution of the touch operation, a current position of the touch operation on the touch panel is detected. Whether the current position is within the designated region is determined. If the current position is within the designated region, the cursor is moved at a first speed. If the current position is not within the designated region, the cursor is moved at a second speed. The first speed is different from the second speed.

In an embodiment of the disclosure, step of setting the designated region on the touch panel based on the initial position of the touch operation includes setting the designated region with the initial position as a center point.

In an embodiment of the disclosure, the cursor control method further includes the following steps. Whether a distance between the current position and a boundary of the designated region is smaller than a predetermined length is determined. If the distance between the current position and the boundary of the designated region is smaller than the predetermined length, the designated region is displayed in the touch panel. If the distance between the current position and the boundary of the designated region is greater than or equal to the predetermined length, the designated region is hidden in the touch panel.

In an embodiment of the disclosure, after step of setting the designated region, the method further includes the following steps. A transition region surrounding a periphery of the designated region is set. If the current position is outside the designated region and located within the transition region, the cursor is moved at the second speed. If the current position is outside the transition region, the cursor is moved at a third speed. The third speed is greater than the second speed, and the second speed is greater than the first speed.

In an embodiment of the disclosure, the second speed is greater than the first speed.

In an embodiment of the disclosure, after the designated region is set, the method further includes the following step. The designated region is displayed in the touch panel, and when it is detected that the touch operation is released, a display of the designated region is ended.

In an embodiment of the disclosure, the cursor control method further includes the following step. When it is detected that the touch operation is released, a setting of the designated region is canceled.

An electronic apparatus of the disclosure includes a display, a touch panel and a processor. The display is configured to display a cursor. The touch panel is configured to receive a touch operation. The processor is coupled to the display and the touch panel. The processor sets a designated region on the touch panel based on an initial position of the touch operation. During an execution of the touch operation, the processor detects a current position of the touch operation on the touch panel and determines whether the current position is within the designated region. If the current position is within the designated region, the processor moves the cursor at a first speed. If the current position is not within the designated region, the processor moves the cursor at a second speed. The first speed is different from the second speed.

To sum up, the disclosure can achieve dynamically adjusting the moving speed of the cursor and even though the size of the touch panel is limited, the disclosure can achieve dynamically adjusting the moving speed of the cursor based on the initial position which is initially touched on the touch panel and the current touch position. In this way, the convenience of the touch panel can be enhanced, thereby improving the smoothness of the cursor operation.

To make the above features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
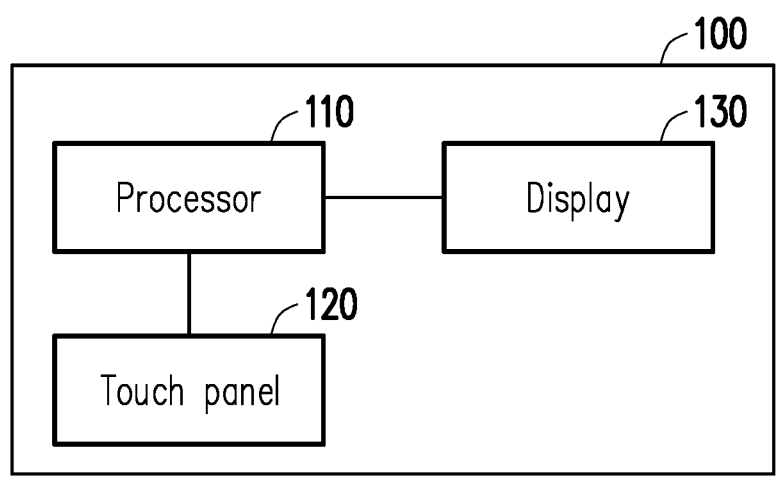
FIG. 1 is a block diagram of an electronic apparatus according to an embodiment of the disclosure.

FIG. 1 is a block diagram of an electronic apparatus according to an embodiment of the disclosure. Referring to FIG. 1, an electronic apparatus 100 includes a processor 110, a touch panel 120 and a display 130. The processor 110 is coupled to the touch panel 120 and the display 130. In this case, the electronic apparatus 100 may be a desktop computer, a notebook computer or the like. The processor 110 may be implemented by a central processing unit (CPU), a graphic processing unit (GPU), a physics processing unit (PPU), a programmable microprocessor, an embedded control chip, a digital signal processor (DSP), an application specific integrated circuit (ASIC) or other similar devices. The touch panel 120 may be a capacitive touch panel, a resistive touch panel, an ultrasonic touch panel, an optical (infrared) touch panel or the like. The monitor 130 is, for example, a liquid crystal display, a plasma display or the like.

A touch operation of a user is received by the touch panel 120, such that a cursor may be correspondingly moved in the display 130. For example, the user may perform the touch operation on the touch panel 120 by a finger, a stylus or other manners. The processor 110 controls the movement of the cursor displayed on the display 130 according to the touch operation received by the touch panel 120.

Figure 2:
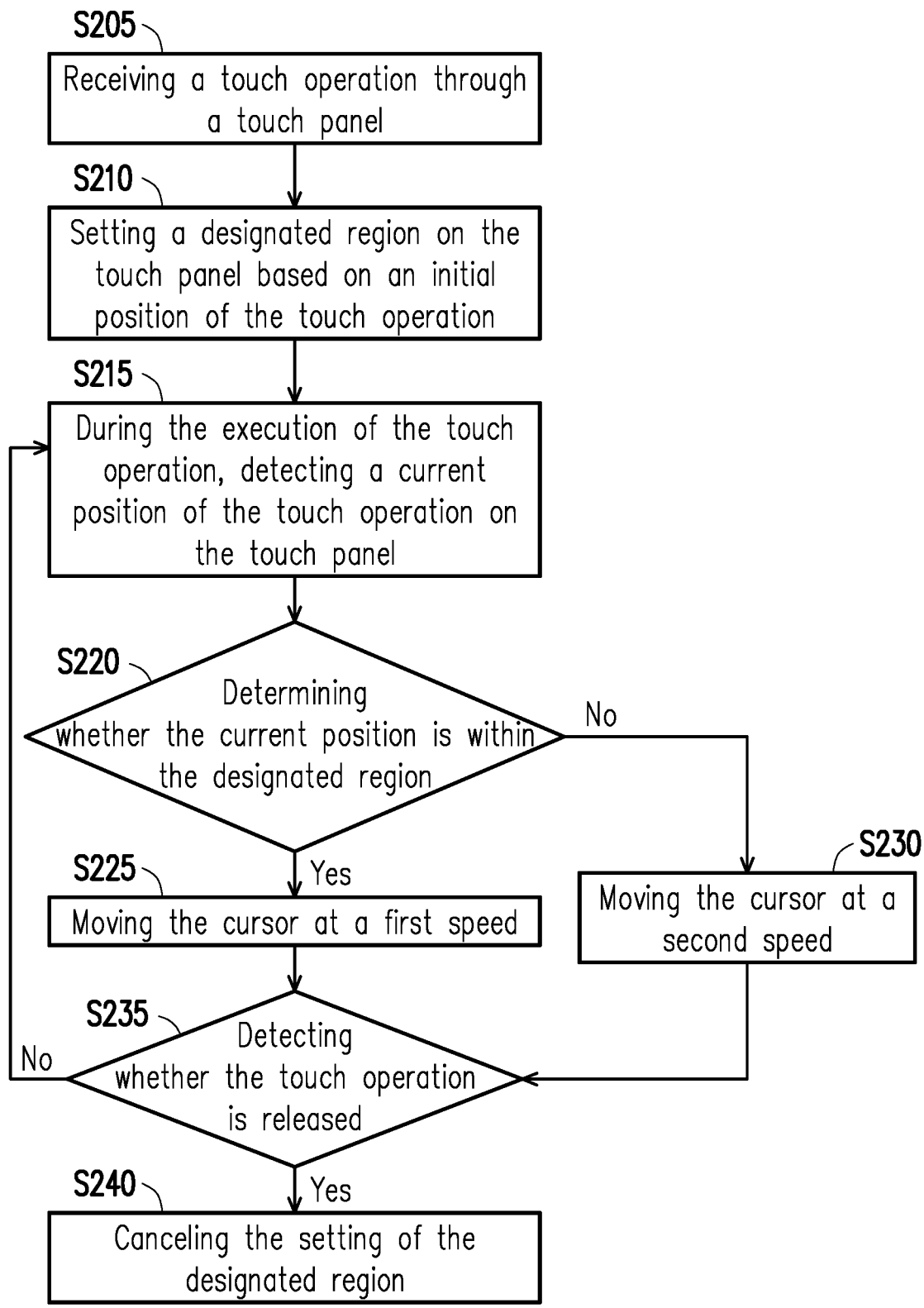
FIG. 2 is a flow chart illustrating a cursor control method according to an embodiment of the disclosure.

Each step of a cursor control method will be described below with reference to the aforementioned electronic apparatus 100. FIG. 2 is a flow chart illustrating a cursor control method according to an embodiment of the disclosure. Referring to FIG. 1 and FIG. 2 simultaneously, in step S205, a touch operation is received through the touch panel 120. Then, in step S210, the processor 110 sets a designated region on the touch panel 120 based on an initial position of the touch operation. For example, in a scenario that the designated region is a circular shape, the designated region is set by employing the initial position as a center point and employing a designated length which is predetermined based on the size or a use requirement for the touch panel 120 as a radius. In addition, the designated region may also be a rectangular shape or other shapes.

Here, in an embodiment, the designated region is invisible, while in another embodiment, the designated region is visible. For example, after the touch operation is received and the designated region is set, the designated region may be displayed in the touch panel 120 until it is detected that the touch operation is released, and then, the display of the designated region is ended.

Additionally, in other embodiments, the designated region may also be set as dynamically displayed. Namely, the designated region is displayed in the touch panel 120 only when a current position of the touch operation is close to a boundary of the designated region. Specifically, the processor 110 determines whether a distance between the current position and the boundary of the designated region is smaller than a predetermined length. If the distance between the current position and the boundary of the designated region is smaller than the predetermined length, the processor 110 displays the designated region in the touch panel. If the distance between the current position and the boundary of the designated region is greater than or equal to the predetermined length, the processor 110 hides the designated region in the touch panel.

After the setting of the designated region is completed, in step S215, during the execution of the touch operation, the processor 110 detects the current position of the touch operation on the touch panel 120. And, in step S220, the processor 110 determines whether the current position is within the designated region.

If the current position is within the designated region, in step S225, the processor 110 moves the cursor at a first speed based on a detected movement amount and a detected moving direction of the touch operation. If the current position is not within the designated region, in step S230, the processor 110 moves the cursor at a second speed based on the detected movement amount and the detected moving direction of the touch operation. In this case, the first speed is different from the second speed. For example, the second speed may be set to be greater than the first speed. Accordingly, when it is detected that the current position of the touch operation is outside the designated region, the cursor is moved at the second speed greater than the first speed, and when it is detected that the current position of the touch operation again returns to the designated region, the cursor is moved at the first speed.

Figure 3:
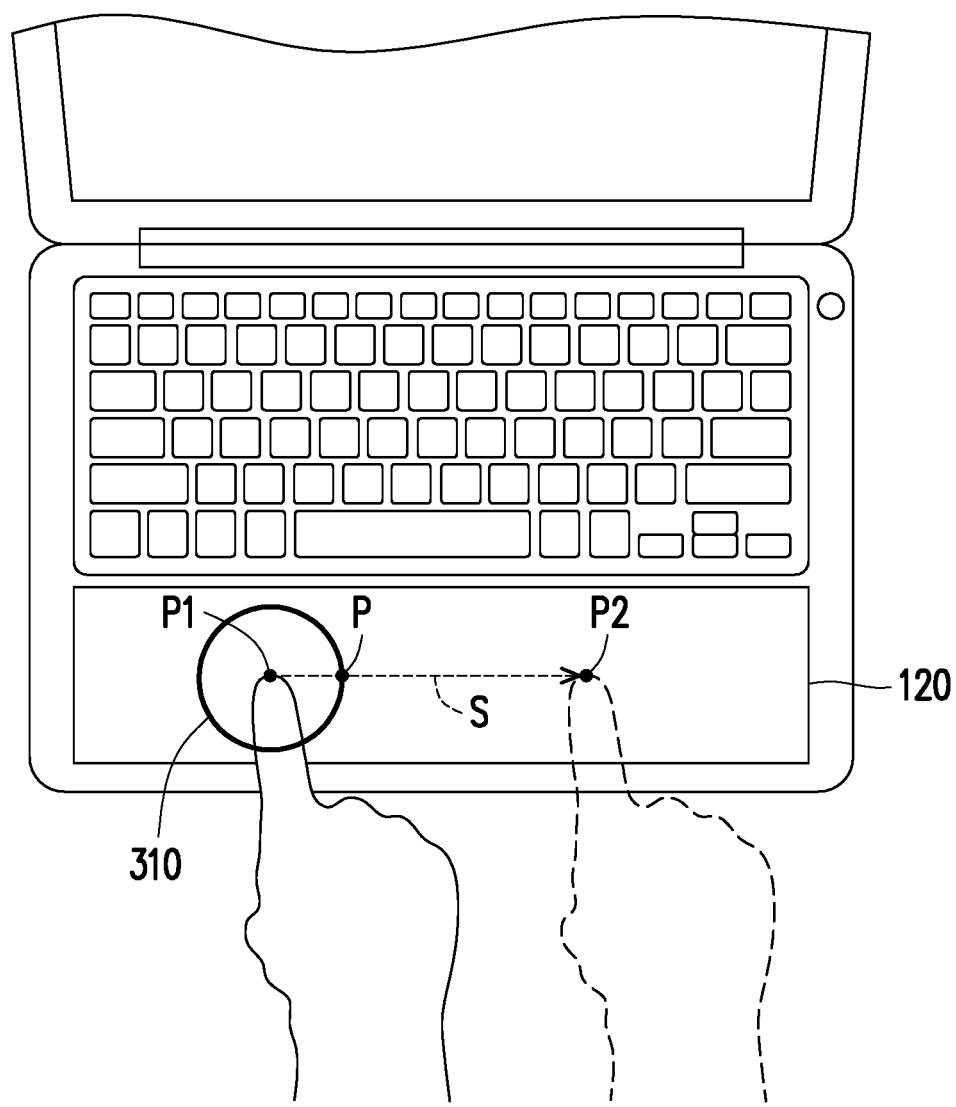
FIG. 3 is a schematic diagram of the touch operation according to an embodiment of the disclosure.

FIG. 3 is a schematic diagram of the touch operation according to an embodiment of the disclosure. In FIG. 3, a notebook computer is used as one of the implementation manners of the electronic apparatus 100. When the user performs a touch operation S moving from a position P1 to a position P2 on the touch panel 120, the processor 110 sets a designated region 310 based on an initial position, i.e., the position P1, of the touch operation S. During the process in which the touch operation S is moved from the position P1 to the position P2, the processor 110 controls the cursor to move at the first speed. When the touch operation S is outside the designated region 310, i.e., during the process in which the touch operation S is moved from the position P to the position P2, the processor 110 controls the cursor to move at the second speed.

The setting manner in other embodiments may further include the following. When the current position of the touch operation S is within the designated region 310, the cursor is controlled to move by gradually accelerating at a first acceleration. When the current position of the touch operation S is outside the designated region 310, the cursor is controlled to move by gradually accelerating at a second acceleration.

Alternatively, the setting manner in other embodiments may further include the following. When the current position of the touch operation S is within the designated region 310 and gradually approaches the boundary of the designated region 310, the cursor is controlled to move by gradually accelerating at the first acceleration. When the current position of the touch operation S is within the designated region 310 and gradually approaches the center of the designated region 310, the cursor is controlled to move by gradually decelerating at the first acceleration. When the current position of the touch operation S is outside the designated region 310 and gradually departs away from the boundary of the designated region 310, the cursor is controlled to move by gradually accelerating at the second acceleration. When the current position of the touch operation S is outside the designated region 310 and gradually approaches the boundary of the designated region 310, the cursor is controlled to move by gradually decelerating at the second acceleration. Hence, the description set forth above is only for an illustrative purpose, and the disclosure is not limited thereto.

Returning to FIG. 2, after steps S225 and S230, the processor 110 may also further perform step S235, i.e., whether the touch operation is released is detected. Before detecting that the touch operation is released, the processor returns to step S215 and continues to detect the current position of the touch operation on the touch panel 120. After detecting that the touch operation is released, in step S245, the processor 110 cancels the setting of the designated region.

Next, the processor 110 again performs step S210 when another touch operation is received through the touch panel 120 and continuously perform the subsequent steps. In other words, the processor 110 may dynamically set the designated region based on the initial position on the touch panel 120 which is touched by the user during each touch operation and cancel the setting of the designated region when the user completes the touch operation.

Moreover, after step S215, the processor 110 may further set a transition region, moves the cursor at the second speed when the current position of the touch operation is within the transition region and moves the cursor at a third speed when the current position of the touch operation is outside the transition region.

Figure 4:
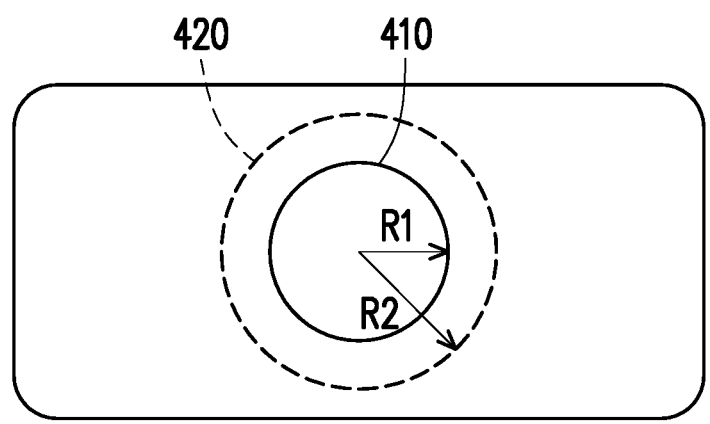
FIG. 4 is a schematic diagram of setting the designated region according to another embodiment of the disclosure.

FIG. 4 is a schematic diagram of setting the designated region according to another embodiment of the disclosure. Referring to FIG. 4, after setting a designated region 410 based on an initial position of the touch operation, the processor 110 sets a transition region 420 by surrounding the periphery of the designated region 410. In this case, the processor 110 sets the designated region 410, for example, by centering on the initial position with a radius R1, sets an outer boundary of the transition region 420 with a radius R2 and employs a boundary of the designated region 410 as an inner boundary of the transition region 420. Namely, the processor 110, with the initial position as the center point, sets a region which exceeds a range with the radius R1 but does not exceed a range with the radius R2 as the transition region 420.

If the current position of the touch operation is outside the designated region 410 and located within the transition region 420, the processor 110 moves the cursor at the second speed. If the current position is outside the transition region 420 (i.e., exceeds the range with the radius R2), the processor 110 moves the cursor at the third speed. In this case, the third speed is greater than the second speed, and the second speed is greater than the first speed. In other words, the farther the touch operation is distant from the initial position, the faster the cursor moves.

Related description will set forth with reference to the dynamic display of the designated region 410.

After the designated region 410 and the transition region 420 are set, the processor 110 detects a movement amount and a moving direction of the touch operation and correspondingly controls the cursor to move at the first speed based on the movement amount and the moving direction and determines whether a distance between the current position and the boundary of the designated region 410 is smaller than a predetermined length. If the distance between the current position and the boundary of the designated region 410 is not smaller than the predetermined length, and the processor 110 detects that the touch operation is released, the settings of the designated region 410 and the transition region 420 are canceled.

If the current position is located within the designated region 410, and the distance between the current position and the boundary of the designated region 410 is smaller than the predetermined length, the processor 110 displays the designated region in the touch panel 120 while detecting the movement amount and the moving direction of the touch operation to correspondingly control the cursor to move at the first speed based on the movement amount and the moving direction and determines whether the current position of the touch operation is outside the designated region 410.

In a condition that the distance between the current position and the boundary of the designated region 410 is smaller than the predetermined length, and the current position is not outside the designated region 410, the processor 110 stops displaying the designated region 410 and cancels the settings of the designated region 410 and the transition region 420 if detecting that the touch operation is released.

When detecting that the current position of the touch operation is outside the designated region 410 and located within the transition region 420, the processor 110 detects the movement amount and the moving direction of the touch operation, correspondingly controls the cursor to move at the second speed based on the movement amount and the moving direction and determines whether the current position of the touch operation is outside the transition region 420.

When the current position is within the transition region 420, and it is detected that the touch operation is released, the processor 110 stops displaying the designated region 410 and cancels the settings of the designated region 410 and the transition region 420.

When determining that the current position of the touch operation is outside the transition region 420, the processor 110 detects the movement amount and the moving direction of the touch operation and correspondingly controls the cursor to move at the third speed based on the movement amount and the moving direction. When the current position of the touch operation is outside the transition region 420, and it is detected that the touch operation is released, the processor 110 stops displaying the designated region 410 and cancels the settings of the designated region 410 and the transition region 420.

In addition, the number of the transition region may be set to a plurality depending on the situation, and the more the transition region approaches the outside, the more the corresponding moving speed of the cursor is increased.

Based on the above, in the disclosure, the designated region is set dynamically based on the initial position of each touch operation and the moving speed of the cursor is adjusted dynamically according to whether the current position is located within the designated region. In this way, the effect of smoothly controlling the cursor can be obtained even through the touch panel, so as to improve the smoothness of the cursor operation and enhance the convenience of the touch panel as well as increase the user's will to operate the cursor by using the touch panel.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A cursor control method for operating a cursor displayed in a display, the method comprising:
   receiving a touch operation through a touch panel, wherein the cursor is moved based on the touch operation;
   setting a designated region on the touch panel based on an initial position of the touch operation;
   during an execution of the touch operation, detecting a current position of the touch operation on the touch panel;
   determining whether the current position is within the designated region;
   if the current position is within the designated region, moving the cursor at a first speed;

if the current position is not within the designated region, moving the cursor at a second speed, wherein the first speed is different from the second speed;

determining whether a distance between the current position and a boundary of the designated region is smaller than a predetermined length;

if the distance between the current position and the boundary of the designated region is smaller than the predetermined length, displaying the designated region in the touch panel; and if the distance between the current position and the boundary of the designated region is greater than or equal to the predetermined length, hiding the designated region in the touch panel.

2. The cursor control method according to claim 1, wherein step of setting the designated region on the touch panel based on the initial position of the touch operation comprises:

setting the designated region with the initial position as a center point.

3. The cursor control method according to claim 1, where after step of setting the designated region, the method further comprises:

setting a transition region surrounding a periphery of the designated region;

if the current position is outside the designated region and located within the transition region, moving the cursor at the second speed; and if the current position is outside the transition region, moving the cursor at a third speed, wherein the third speed is greater than the second speed, and the second speed is greater than the first speed.

4. The cursor control method according to claim 1, wherein the second speed is greater than the first speed.

5. The cursor control method according to claim 1, wherein after step of setting the designated region, the method further comprises:

displaying the designated region in the touch panel; and when it is detected that the touch operation is released, ending a display of the designated region.

6. The cursor control method according to claim 1, further comprising:

when it is detected that the touch operation is released, canceling a setting of the designated region.

7. An electronic apparatus, comprising:

a display, displaying a cursor;

a touch panel, receiving a touch operation; and a processor, coupled to the display and the touch panel, wherein the processor sets a designated region on the touch panel based on an initial position of the touch operation, detects a current position of the touch operation on the touch panel during an execution of the touch operation, determines whether the current position is within the designated region, moves the cursor at a first speed if the current position is within the designated region and moves the cursor at a second speed if the current position is not within the designated region, wherein the first speed is different from the second speed, and wherein the processor determines whether a distance between the current position and a boundary of the designated region is smaller than a predetermined length, displays the designated region in the touch panel if the distance between the current position and the boundary of the designated region is smaller than the predetermined length and hides the designated region in the touch panel if the distance between the current position and the boundary of the designated region is greater than or equal to the predetermined length.

8. The electronic apparatus according to claim 7, wherein the processor sets the designated region with the initial position as a center point.

9. The electronic apparatus according to claim 7, wherein the processor sets a transition region surrounding a periphery of the designated region, moves the cursor at the second speed if the current position is outside the designated region and located within the transition region and moves the cursors at a third speed if the current position is outside the transition region, wherein the third speed is greater than the second speed, and the second speed is greater than the first speed.

10. The electronic apparatus according to claim 7, wherein the second speed is greater than the first speed.

11. The electronic apparatus according to claim 7, wherein the processor displays the designated region in the touch panel after setting the designated region and ends displaying the designated region when detecting that the touch operation is released.

12. The electronic apparatus according to claim 7, wherein the processor cancels a setting of the designated region when detecting that the touch operation is released.

* * * * *